US012705905B2

(12) United States Patent
Jackobson et al.

(10) Patent No.: US 12,705,905 B2
(45) Date of Patent: Aug. 11, 2026

(54) ROAD BOUNDARY DETECTION BASED ON RADAR AND VISUAL INFORMATION

(71) Applicant: AUTOBRAINS TECHNOLOGIES LTD, Tel Aviv-Jaffa (IL)

(72) Inventors: Omer Jackobson, Tel Aviv (IL); Oz Sharlin, Tel Aviv (IL); Tomer Livne, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 821 days.

(21) Appl. No.: 18/052,555

(22) Filed: Nov. 3, 2022

(65) Prior Publication Data

US 2023/0162512 A1 May 25, 2023

Related U.S. Application Data

(60) Provisional application No. 63/263,501, filed on Nov. 3, 2021.

(51) Int. Cl.
*G06V 20/56* (2022.01)
*G06V 10/20* (2022.01)
(Continued)

(52) U.S. Cl.
CPC .......... *G06V 20/588* (2022.01); *G06V 10/255* (2022.01); *G06V 10/44* (2022.01); *G06V 10/764* (2022.01); *G06V 10/809* (2022.01); *B60W 60/0013* (2020.02); *B60W 2420/403* (2013.01); *B60W 2420/408* (2024.01)

(58) Field of Classification Search
CPC .... G06V 20/588; G06V 10/255; G06V 10/44; G06V 10/764; G06V 10/809; B60W 60/0013; B60W 2420/403; B60W 2420/408
See application file for complete search history.

(56) References Cited

U.S. PATENT DOCUMENTS

| | | | | |
|---|---|---|---|---|
| 10,691,959 | B2 * | 6/2020 | Kumano | G06T 7/12 |
| 2016/0090084 | A1 * | 3/2016 | Takamatsu | B60W 30/10 701/1 |

(Continued)

*Primary Examiner* — Oneal R Mistry
*Assistant Examiner* — Jongbong Nah
(74) *Attorney, Agent, or Firm* — RECHES PATENTS

(57) ABSTRACT

A method for detecting a road-boundary based on radar information and visual information, the method may include (a) estimating, based on the visual information obtained by a visual sensor, locations of road-boundary points up to a first distance from the visual sensor; wherein a distance ambiguity of visual based location determination of road-boundary points with the first distance range does not exceed a predefined ambiguity threshold; wherein a distance ambiguity of visual based location determination of road-boundary points outside the first distance exceeds a predefined ambiguity threshold; (b) estimating, based at least on (i) the radar information, and (ii) angular-constrains regarding angular relationships between adjacent road-boundary points, locations of road-boundary points outside the first distance range; and (c) determining the shape and position of the road-boundary based on the locations of the road-boundary points within the first range distance.

20 Claims, 4 Drawing Sheets

(51) Int. Cl.

| | |
|---|---|
| ***G06V 10/44*** | (2022.01) |
| ***G06V 10/764*** | (2022.01) |
| ***G06V 10/80*** | (2022.01) |
| *B60W 60/00* | (2020.01) |

(56) References Cited

U.S. PATENT DOCUMENTS

| | | | | |
|---|---|---|---|---|
| 2018/0067487 | A1* | 3/2018 | Xu | G01S 17/66 |
| 2020/0218913 | A1* | 7/2020 | Unnikrishnan | G01S 13/867 |
| 2020/0385017 | A1* | 12/2020 | Baba | G06V 20/58 |
| 2021/0080267 | A1* | 3/2021 | Gan | G01C 21/3446 |
| 2022/0196797 | A1* | 6/2022 | Parikh | G01S 13/89 |
| 2023/0122011 | A1* | 4/2023 | Ishimaru | G06T 7/73<br>348/148 |
| 2023/0147535 | A1* | 5/2023 | Terazawa | G01C 21/30 |

* cited by examiner

Radar 210

Visual sensor 220

Controller 230

Processing unit 240

Man machine interface 250

Memory unit 260

Autonomous driving module 270

ADAS module 280

ROAD BOUNDARY DETECTION BASED ON RADAR AND VISUAL INFORMATION

BACKGROUND

Road boundary detection is one of the most important tasks related to autonomous driving (AD) and to advanced drive-assistance system (ADAS).

Road boundary detection that is based solely on visual information that is obtained by a camera that is two-dimensional may be highly inaccurate—as the distances between the camera and the road boundary points are inaccurate.

There is a growing need to provide an accurate road boundary detection solution.

SUMMARY

There may be provided a method, system and non-transitory computer readable medium for road boundary detection based on radar and visual information.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
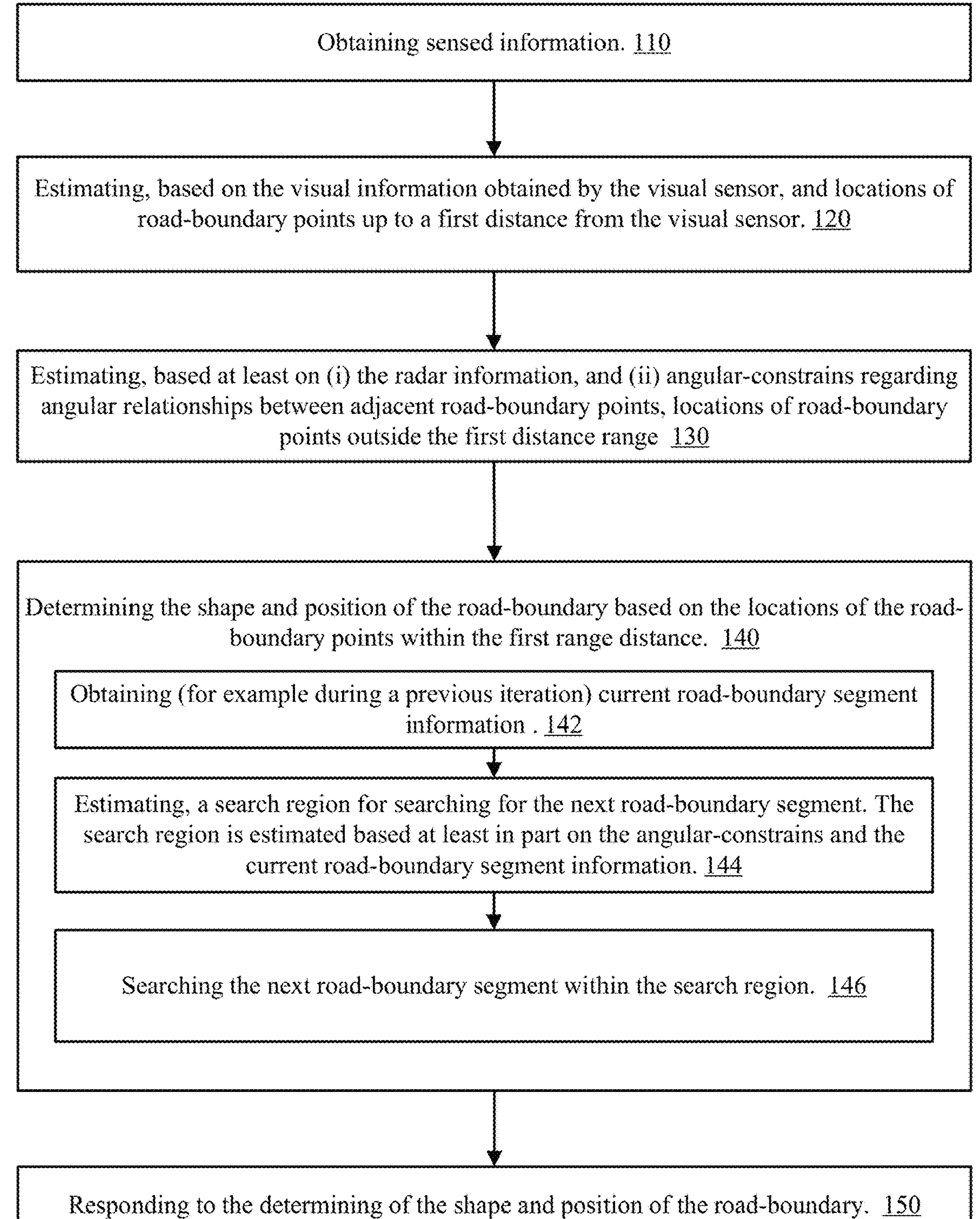
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

There may be provided a system, method and non-transitory computer readable medium that adjusts the autonomous driving pattern to a desired comfort level of one or more persons within a vehicle. The adjustment can be done in an automatic manner (without human intervention) and especially in an unsupervised manner—thus providing a highly efficient and accurate manner to tailor the autonomous driving patterns.

There may be provided a system, method and non-transitory computer readable medium for road boundary detection based on radar and visual information.

The solution is based on using visual information within a short distance from the vehicle, in which the distance ambiguity is tolerable, and using at least radar information outside that short distance. The solution benefits from the high accuracy of the visual information based detection of the locations of the road-boundary points at the short distance. The solution is also based on physical limitations regarding road boundaries—especially an allowed angular change between adjacent road-boundary points—mandated by the role of the road to convey vehicles. For example—when not reaching a junction—the road should have a very moderate (if any) angular limited deviations between adjacent road-boundary points.

Using the visual information within the short range is beneficial as the visual information includes more context than radar information—which makes the distinction between car and a road boundary more accurate when using the visual information and not the radar. Within the short range there is a god mapping between the image positions of pixels of an object and the real world location of the object.

FIG. 1 illustrates an example of a method 100 for detecting a road-boundary based on radar information and visual information.

Method 100 may start by step 110 obtaining sensed information.

The sensed information may include visual information, sensed by a visual sensor (such as a camera), of an environment of the vehicle.

The sensed information may include radar information such as radar points.

Step 110 may be followed by steps 120 and 130.

Step 120 may include estimating, based on the visual information obtained by the visual sensor, and locations of road-boundary points up to a first distance from the visual sensor.

The distance ambiguity of visual based location determination of road-boundary points with the first distance range does not exceed a predefined ambiguity threshold.

A distance ambiguity of visual based location determination of road-boundary points outside the first distance exceeds a predefined ambiguity threshold.

The predefined ambiguity threshold may be determined in any manner—for example—may be below a predefined value, may be below the distance accuracy of a radar, may be a function of the speed of the vehicle, may be a function of a current visibility of the environment (for example—a fog may dramatically reduce the predefined ambiguity threshold), may be function of the angle of the optical axis of the visual sensor in relation to the road (higher angles may provide a more accurate measurement), may by determined based on measurements, may be based on the accuracy of the visual sensor, may be constant, and the like.

The first distance range may be, for example a few meters, a few tens of meters (for example—up to 10, 20, 30, 40, 50 meters and the like).

Step 130 may include estimating, based at least on (i) the radar information, and (ii) angular-constrains regarding angular relationships between adjacent road-boundary points, locations of road-boundary points outside the first distance range.

Step 130 may be executed based, at least in part, on visual information regarding the road-boundary points outside the first distance range—or may be executed regardless any visual information about road-boundary points outside the first distance range.

When using the visual information regarding the road-boundary points outside the first distance range—the visual information may be assigned less weight (or less importance) in comparison to the radar information.

Steps 120 and 130 may be followed by step 140 of determining the shape and position of the road-boundary based on the locations of the road-boundary points within the first range distance.

Step 140 may be executed in an iterative manner. The iterative manner may start or may take into account the locations of the road-boundary points (as determined during step 120) at the end of the first distance range or near the end of the first distance range as a starting point.

The estimation of the shape and position at the road-boundary may be executed on a segment to segment basis. A segment may span along a certain distance, the certain distance may fixed, may depend on the road conditions, may depend on the distance from the vehicle, may include a predefined number of road-boundary points, may include a predefined number of image pixels, may be based on proximity to junctions, and the like. A segment may range, for example between a few tens of centimeters to a few tens of meters, and more.

Step 140 may include executing multiple iterations.

Figure 4:
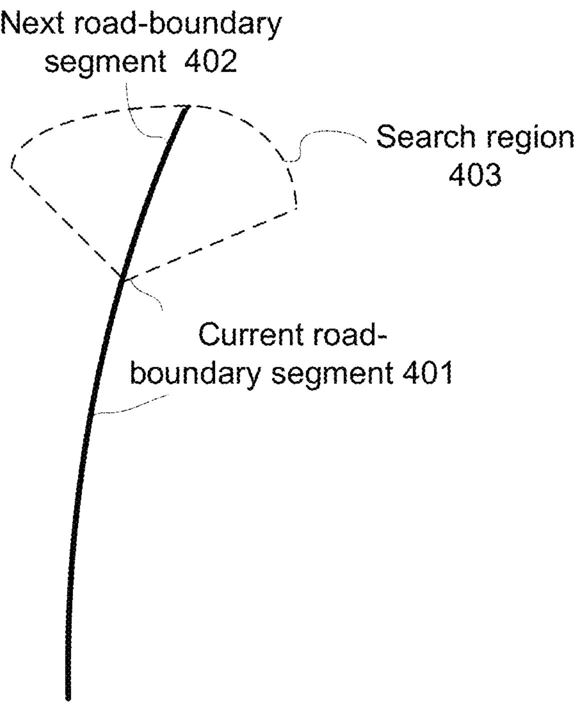
FIG. 4 illustrates an example of iterations of a step of the method of FIG. 1.

Each iteration may include:

a. Step 142 of obtaining (for example during a previous iteration) current road-boundary segment information (see current road-boundary segment 401 of FIG. 4). The current road-boundary segment information may include information regarding a location of at least an end point of a current road-boundary segment, and/or information about the shape of the current road-boundary segment.

b. Step 144 of estimating a search region (see search region 403 of FIG. 4) for searching for the next road-boundary segment. The search region is estimated based at least in part on the angular-constrains and the current road-boundary segment information. The search region define possible locations of the next road-boundary segment.

c. Step 146 of searching the next road-boundary segment (see next road-boundary segment 403 of FIG. 4) within the search region.

Step 150 may include responding to the determining of the shape and position of the road-boundary.

Step 150 may include at least one out of:

a. Displaying the road-boundary and/or any other information about the road-boundary to a user.

b. Generating and/or storing and/or transmitting road-boundary information.

c. Using the road-boundary information to augment a display of objects to a user.

d. Sending the road-boundary information to another processor.

e. Sending the road-boundary information to another sensor.

f. Fusing the road-boundary information with sensed data from another sensor.

g. Validating the road-boundary information using other information—for example a map of the environment of any other source of data regarding the road within the environment of the vehicle.

h. Evaluating the distance ambiguity of the visual based location determination and/or the first distance range and/or the predefined ambiguity threshold. This can be done, for example, using the estimates of the locations of the road-boundaries—based on the visual information and/or radar information.

i. Controlling at least one of a transmission scheme and a reception scheme of the radar—for example selecting an illumination pattern for illuminating certain objects within the field of view of the radar, amending the scan rate of the radar, entering an idle mode, changing a mode of operation of the radar, or setting any other TX/RX parameter of the radar.

j. Controlling a driving of a vehicle that includes the radar and the visual sensor, and/or providing information about the object and/or suggested driving path to a human driver or an autonomous or semi-autonomous module of a vehicle.

Figure 2:
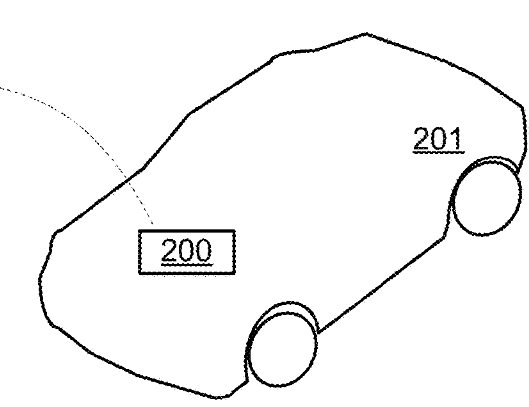
FIG. 2 illustrates an example of a system.

FIG. 2 illustrates a system 200 of vehicle 201.

System may include radar 210. visual sensor 220 such as a camera, controller 230, processing unit 240, man machine interface such as display 250, memory unit 260, autonomous driving module 270 and ADAS module 280.

The autonomous driving module 270, and ADAS module 280 may respond to road-boundary information generated by the processing unit 240.

The controller 230 may control the operation of the system 200.

Figure 3:
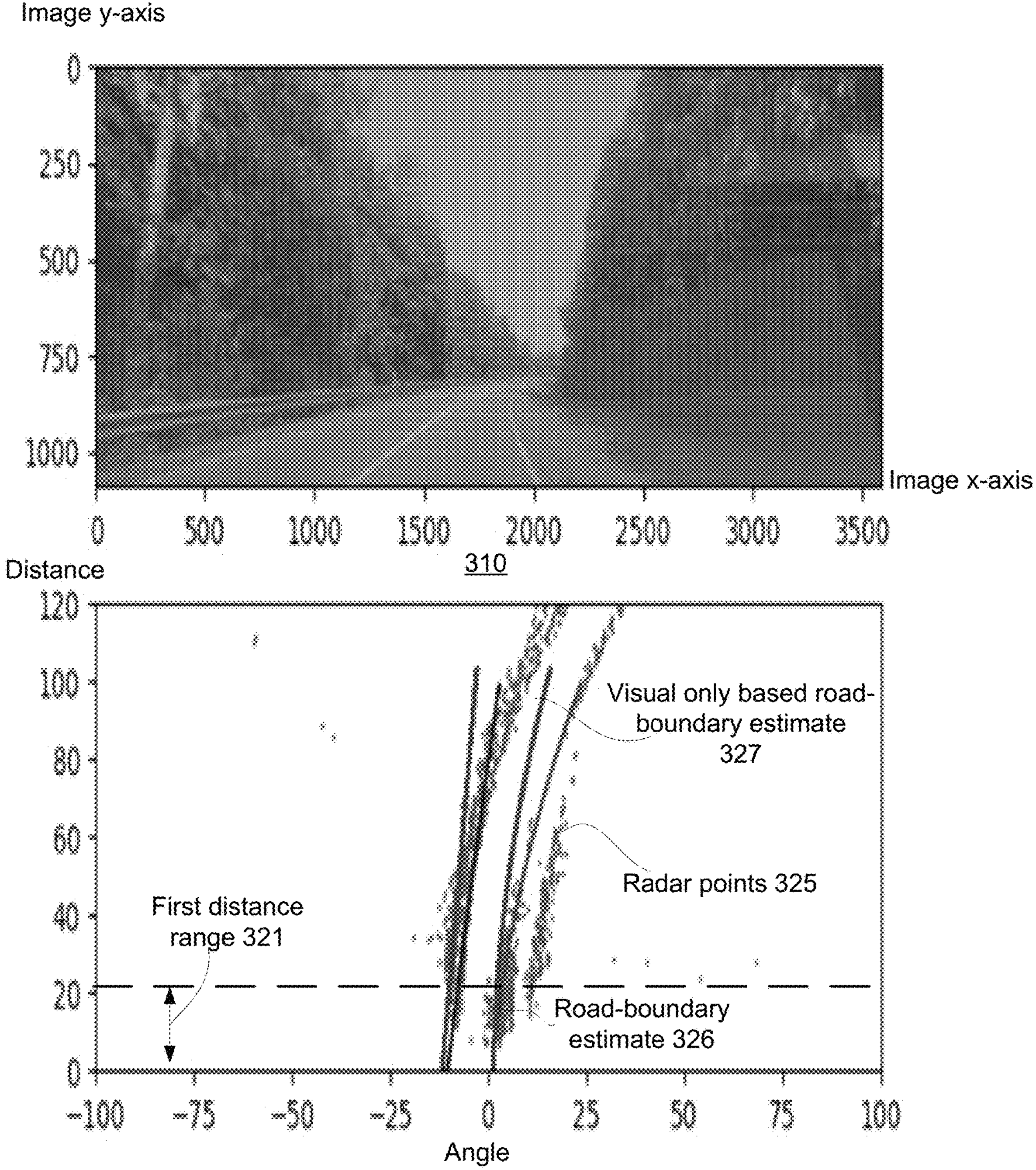
FIG. 3 illustrates an example of an image and various information.

FIG. 3 is an example of an image 310 of an environment that includes a road having road segments. FIG. 3 also illustrates radar points 325, first distance range 321. and a road-boundary estimate 326 (generated by applying method 100). The figure also illustrates an inaccurate estimate of the road-boundary 327 that is based solely on visual information.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer program product such as non-transitory computer readable medium. All or some of the computer program may be provided on non-transitory computer readable media permanently, removably or remotely coupled to an information processing system. The non-transitory computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc. A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system. The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments. Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for detecting a road-boundary of a road based on radar information and visual information, the method comprises:

estimating, based on the visual information obtained by a visual sensor of a vehicle, locations of road-boundary points up to a first distance from the visual sensor; wherein the visual information also comprises road-boundary points beyond to the first distance; wherein a distance ambiguity of visual based location determination of road-boundary points with the first distance range does not exceed an ambiguity threshold; wherein a distance ambiguity of visual based location determination of road-boundary points outside the first distance exceeds the ambiguity threshold; wherein a distance ambiguity of visual based location determination of a road-boundary point is an uncertainty associated with a determining of a location of the road-boundary point;

estimating, based at least on (i) the radar information, and (ii) angular-constrains regarding angular relationships between adjacent road-boundary points, wherein the angular constraints define a maximum allowed angular deviation between adjacent road-boundary points, the estimating uses the angular constraints to iteratively search for successive road-boundary segments within search regions defined by the angular constraints, to determine locations of road-boundary points outside the first distance range; wherein the angular constraints are based on physical limitations regarding road boundaries; and determining the shape and position of the road-boundary based on the locations of the road-boundary points within the first range distance.

2. The method according to claim 1, wherein the estimating of the locations of the road-boundary points outside the first distance is executed in an iterative manner.

3. The method according to claim 2, wherein the iterative manner starts from the first distance.

4. The method according to claim 1, comprising obtaining a location of a current road-boundary segment; estimating a search region for searching for the next road-boundary segment, based at least in part on the angular-constrains; and searching the next road-boundary segment within the search region.

5. The method according to claim 1, wherein the first distance does not exceed few tens of meters.

6. The method according to claim 1, wherein the estimating of the locations of road-boundary points outside the first distance range is also based on visual information about locations of road-boundary points outside the first distance range.

7. The method according to claim 1, comprising responding to the determining of the shape and position of the road-boundary.

8. The method according to claim 7, wherein the responding comprises validating road-boundary information about the determining the shape and position of the road-boundary based on a map of an environment of the vehicle.

9. The method according to claim 1, comprising dynamically determining the ambiguity threshold thereby dynamically determining the first distance.

10. The method according to claim 9, wherein the dynamically determining of the ambiguity threshold is based on a current visibility of an environment of the vehicle.

11. The method according to claim 9, wherein the dynamically determining of the ambiguity threshold is based on an angle of an optical axis of the visual sensor to the road.

12. A non-transitory computer readable medium for detecting a road-boundary of a road based on radar information and visual information, the non-transitory computer readable medium stores instructions for:

estimating, based on the visual information obtained by a visual sensor, and locations of road-boundary points up to a first distance from the visual sensor of a vehicle; wherein the visual information also comprises road-boundary points beyond to the first distance;

wherein a distance ambiguity of visual based location determination of road-boundary points with the first distance range does not exceed an ambiguity threshold; wherein a distance ambiguity of visual based location determination of road-boundary points outside the first distance exceeds the ambiguity threshold; wherein a distance ambiguity of visual based location determination of a road-boundary point is an uncertainty associated with a determining of a location of the road-boundary point;

estimating, based at least on (i) the radar information, and (ii) angular-constrains regarding angular relationships between adjacent road-boundary points, wherein the angular constraints define a maximum allowed angular deviation between adjacent road-boundary points, the estimating uses the angular constraints to iteratively search for successive road-boundary segments within search regions defined by the angular constraints, to determine locations of road-boundary points outside the first distance range; wherein the angular constraints are based on physical limitations regarding road boundaries;

determining the shape and position of the road-boundary based on the locations of the road-boundary points within the first range distance.

13. The non-transitory computer readable medium according to claim 12, wherein the estimating of the locations of the road-boundary points outside the first distance is executed in an iterative manner.

14. The non-transitory computer readable medium according to claim 13, wherein the iterative manner starts from the first distance.

15. The non-transitory computer readable medium according to claim 12, further storing instructions for obtaining a location of a current road-boundary segment; estimating a search region for searching for the next road-boundary segment, based at least in part on the angular-constrains; and searching the next road-boundary segment within the search region.

16. The non-transitory computer readable medium according to claim 12, wherein the first distance does not exceed few tens of meters.

17. The non-transitory computer readable medium according to claim 12, wherein the estimating of the locations of road-boundary points outside the first distance range is also based on visual information about locations of road-boundary points outside the first distance range.

18. The non-transitory computer readable medium according to claim 12, that further stores instructions for responding to the determining of the shape and position of the road-boundary.

19. The non-transitory computer readable medium according to claim 16, wherein the responding comprises validating road-boundary information about the determining the shape and position of the road-boundary based on a map of an environment of the vehicle.

20. A system that comprises a processor that is configured to:

estimate, based on the visual information obtained by a visual sensor of a vehicle, locations of road-boundary points up to a first distance from the visual sensor; wherein a distance ambiguity of visual based location determination of road-boundary points with the first distance range does not exceed a ambiguity threshold; wherein a distance ambiguity of visual based location determination of road-boundary points outside the first distance exceeds a ambiguity threshold; wherein a distance ambiguity of visual based location determination of a road-boundary point is an uncertainty associated with a determining of a location of the road-boundary point; dynamically determining the ambiguity threshold thereby dynamically determining the first distance;

estimate, based at least on (i) the radar information, and (ii) angular-constrains regarding angular relationships between adjacent road-boundary points, wherein the angular constraints define a maximum allowed angular deviation between adjacent road-boundary points, the estimating uses the angular constraints to iteratively search for successive road-boundary segments within search regions defined by the angular constraints, to determine locations of road-boundary points outside the first distance range; wherein the angular constraints are based on physical limitations regarding road boundaries;

determine the shape and position of the road-boundary of a road based on the locations of the road-boundary points within the first range distance; and dynamically determine the ambiguity threshold thereby dynamically determining the first distance.

* * * * *